United States Patent
Sugikawa

(10) Patent No.: US 10,133,068 B2
(45) Date of Patent: Nov. 20, 2018

(54) COLD MIRROR FOR HEAD-UP DISPLAY APPARATUS AND HEAD-UP DISPLAY APPARATUS

(71) Applicant: MURAKAMI CORPORATION, Shizuoka (JP)

(72) Inventor: Tomohiko Sugikawa, Yaizu (JP)

(73) Assignee: MURAKAMI CORPORATION, Shizuoka (JP)

( * ) Notice: Subject to any disclaimer, the term of this patent is extended or adjusted under 35 U.S.C. 154(b) by 130 days.

(21) Appl. No.: 15/332,180

(22) Filed: Oct. 24, 2016

(65) Prior Publication Data

US 2017/0139206 A1 May 18, 2017

(30) Foreign Application Priority Data

Nov. 16, 2015 (JP) .................................. 2015-224276

(51) Int. Cl.
 *G02B 27/01* (2006.01)
 *G02B 5/08* (2006.01)
 *G02B 5/30* (2006.01)

(52) U.S. Cl.
 CPC .......... *G02B 27/0101* (2013.01); *G02B 5/08* (2013.01); *G02B 5/0833* (2013.01); *G02B 5/3066* (2013.01); *G02B 2027/0116* (2013.01)

(58) Field of Classification Search
 CPC .. G02B 27/01; G02B 27/0101; G02B 27/017; G02B 27/0172; G02B 5/08; G02B 5/0816; G02B 5/0825; G02B 5/0833; G02B 5/0841; G02B 5/085–5/0875; G02B 5/3066; G02B 2027/0112;

(Continued)

(56) References Cited

U.S. PATENT DOCUMENTS

| | | | |
|---|---|---|---|
| 4,322,130 A | * | 3/1982 | Ito .......................... C03C 17/36 359/485.07 |
| 4,536,063 A | | 8/1985 | Southwell |

(Continued)

FOREIGN PATENT DOCUMENTS

| | | |
|---|---|---|
| CA | 1323234 | 10/1993 |
| JP | 2004-347633 | 12/2004 |
| JP | 2014-3052 | 1/2014 |

OTHER PUBLICATIONS

Extended European Search Report in EP Appl. No. 16002366.9 dated Mar. 24, 2017.

*Primary Examiner* — Stephone B Allen
*Assistant Examiner* — Adam W Booher
(74) *Attorney, Agent, or Firm* — Greenblum & Bernstein, P.L.C.

(57) ABSTRACT

This invention relates to a cold mirror for a head-up display apparatus and provides a cold mirror that enables suppression of a phenomenon of change in color tone of an image depending on a position from which the image is viewed. This invention also provides a head-up display apparatus including the cold mirror. In a head-up display apparatus, display light of an image displayed on a display is reflected by a cold mirror and a reflected image of the image is viewed by a viewer. A relationship between an incident wavelength and a reflection phase difference in the cold mirror is set so that the reflection phase difference falls within a range of 180±60 degrees for an entire visible wavelength range of 420 to 680 nm.

12 Claims, 3 Drawing Sheets

(58) Field of Classification Search
CPC .. G02B 2027/0116; G02B 5/208; G02B 5/26; G02B 5/28; G02B 5/281
See application file for complete search history.

(56) References Cited

U.S. PATENT DOCUMENTS

2007/0046953 A1 3/2007 De Groot et al.
2018/0081172 A1* 3/2018 Liu .................... G02B 27/0101

* cited by examiner

COLD MIRROR FOR HEAD-UP DISPLAY APPARATUS AND HEAD-UP DISPLAY APPARATUS

The disclosure of Japanese Patent Application No. JP2015-224276 filed on Nov. 16, 2015 including the specification, drawings, claims and abstract is incorporated herein by reference in its entirety.

BACKGROUND OF THE INVENTION

1. Field of the Invention

This invention relates a cold mirror for a head-up display (hereinafter abbreviated as "HUD") apparatus in which change in color tone of an image depending on a position from which the image is viewed is reduced. This invention also relates to a HUD apparatus including the cold mirror.

2. Description of the Related Art

A HUD apparatus is, for example, mounted on a vehicle for use in displaying information such as infotainment information and/or ADAS (Advanced Driver Assistance Systems) in a field of view on the front side of a driver. Generally, such in-vehicle HUD apparatus has a configuration in which an image of, e.g., drive information luminously displayed on a display such as a liquid-crystal display is reflected by a mirror to project the image onto a windshield or a combiner in front of a driver. In such in-vehicle HUD apparatus as configured above, upon sun light reversely entering and being reflected by the mirror and then entering the display, the display deteriorates as a result of being heated. Therefore, use of a cold mirror for forming the mirror has conventionally been proposed (for example, Japanese Patent Laid-Open No. 2004-347633 described below). As a result of using a cold mirror for forming the mirror, even if sun light reversely enters, infrared components included in the sun light are absorbed by the cold mirror and the display is thus prevented from being heated.

A test conducted by the present inventor showed that a conventional HUD apparatus including a mirror formed of a cold mirror has a problem in that an image changes in color tone depending on a position from which the image is viewed. For example, if a white image is displayed on the entire display of the in-vehicle HUD apparatus, while the entire display looks white from a viewpoint of a driver, the display sometimes looks somewhat colored from a front passenger seat or a rear seat.

This invention provides a cold mirror for a HUD apparatus, the cold mirror solving the aforementioned problem of the related art and suppressing change in color tone of an image depending on a position from which the image is viewed. This invention also provides a HUD apparatus including the cold mirror.

SUMMARY OF THE INVENTION

This invention provides a cold mirror in a HUD apparatus, the cold mirror reflecting an image displayed on a display to make a reflected image of the image be viewed by a viewer, wherein, when a difference between an amount of variation in phase of p-polarized light reflected by the cold mirror between before and after the reflection and an amount of variation in phase of s-polarized light reflected by the cold mirror between before and after the reflection is defined as a reflection phase difference, a relationship between an incident wavelength and the reflection phase difference is set so that the reflection phase difference falls within a range of 180±60 degrees for an entire visible wavelength range of 420 to 680 nm.

A test conducted by the present inventor showed that in a HUD apparatus including a cold mirror, a phenomenon of change in color tone of an image depending on a position from which the image is viewed occurs due to an effect of a relationship between an incident wavelength of the cold mirror and a reflection phase difference. In other words, a cold mirror for a conventional HUD apparatus is designed only in consideration of spectral reflectivity characteristic optimization (that is, achievement of a spectral reflectivity characteristic that provides a highest possible reflectivity in a visible light range and a lowest possible reflectivity in an infrared range). As a result, a spectral reflection phase difference characteristic of a cold mirror for a conventional HUD apparatus includes a wavelength band in which a reflection phase difference largely deviates from 180 degrees and a polarized light state thereby largely varies within a visible wavelength range of 420 to 680 nm. Thus, upon a position from which an image is viewed being shifted, an intensity of light in that band largely varies, and as a result, the image changes in color tone. Therefore, in this invention, a reflection phase difference of a cold mirror for a HUD apparatus is set within a range of 180±60 degrees for an entire visible wavelength range of 420 to 680 nm. As a result, there is no longer wavelength band in which a polarized light state largely varies, and change in color tone of an image depending on a position from which the image is viewed can be reduced. Consequently, a difference in color tone between an image when viewed from a driver seat and the image when viewed from a front passenger seat or a rear seat can be reduced. In general, a cold mirror for a HUD apparatus is often used in such a manner that an incident angle is set to 20 to 60 degrees relative to an optical axis of display light. A cold mirror according to this invention can be considered particularly effective when the cold mirror is used for this incident angle range. In other words, if the incident angle is small (less than 20 degrees), there are few fluctuations in spectral reflection phase difference characteristic in a visible light range due to a film design, and thus, the need of considering a spectral reflection phase difference characteristic in designing a film is not so high. On the other hand, in a large incident angle region (exceeding 60 degrees), it is difficult to make a film design so that a reflection phase difference falls within a range of 180±60 degrees for an entire visible light range.

In this invention, it is possible that the reflection phase difference of the cold mirror is set within a range of 180±30 degrees for the entire visible wavelength range of 420 to 680 nm. Consequently, change in color tone of an image depending on a position from which the image is viewed can further be reduced.

In this invention, it is possible that an average reflectivity of the cold mirror for the visible wavelength range of 420 to 680 nm is set to no less than 90%. Consequently, bright display can be provided.

A HUD apparatus according to this invention includes a cold mirror according to this invention. The HUD apparatus according to this invention enables reduction of change in color tone of an image depending on a position from which the image is viewed.

DETAILED DESCRIPTION OF THE PREFERRED EMBODIMENT

Figure 2:
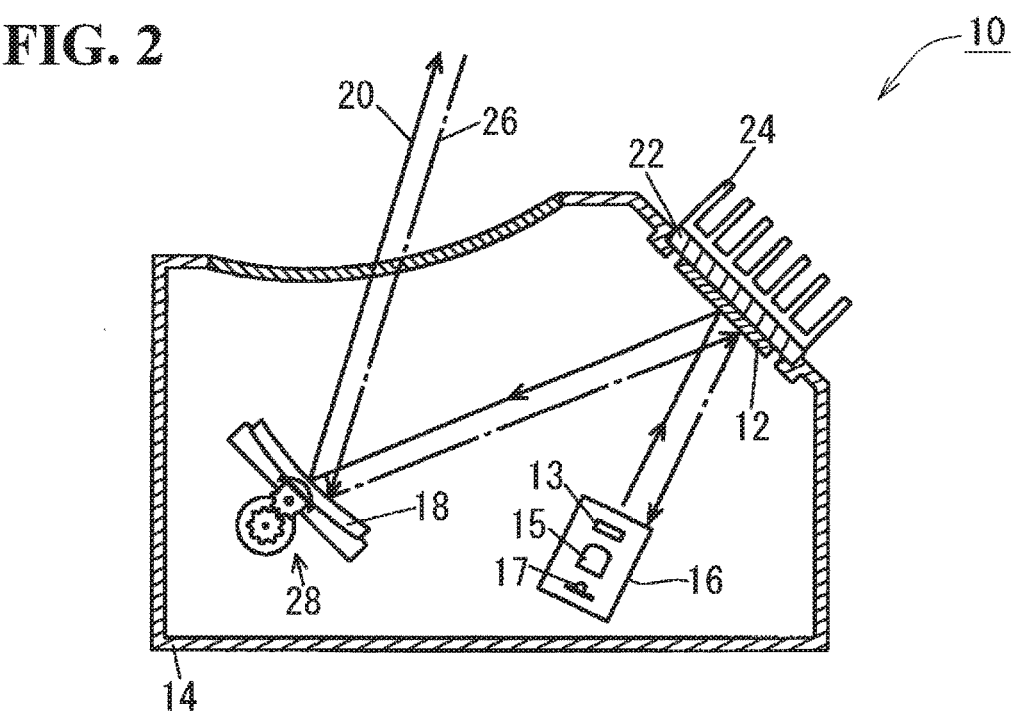
FIG. 2 is a schematic diagram illustrating an embodiment of an in-vehicle HUD apparatus with the cold mirror according to this invention incorporated therein, and illustrates the cold mirror according to this invention incorporated in a HUD apparatus described in Japanese Patent Laid-Open No. 2004-347633.
Figure 3:
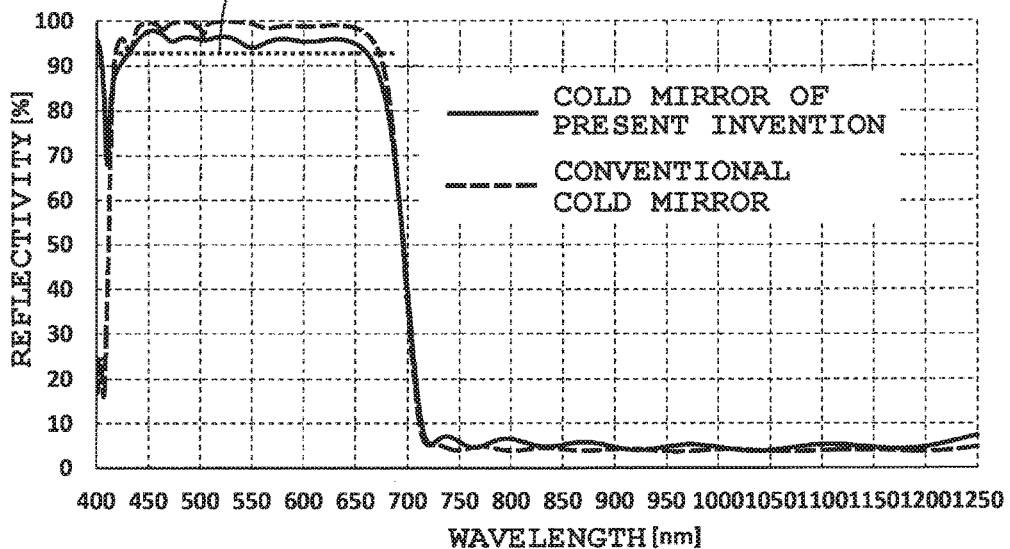
FIG. 3 is a graph indicating respective spectral reflectivity characteristics (simulated values) of the cold mirror in FIG. 1 and a conventional cold mirror.

An embodiment of this invention will be described. FIG. 2 illustrates a HUD apparatus 10 with a cold mirror according to this invention incorporated therein. The HUD apparatus 10 is configured by mounting a cold mirror 12 according to this invention in a HUD apparatus described in Japanese Patent Laid-Open No. 2004-347633. The HUD apparatus 10 is disposed in a dashboard (not illustrated) of a vehicle. In a case 14 of the HUD apparatus 10, e.g., a liquid-crystal display 16, the cold mirror 12 and a concave mirror 18 are housed. The liquid-crystal display 16 luminously displays an image of, e.g., infotainment information and/or ADAS information. The liquid-crystal display 16 incorporates, e.g., a liquid-crystal element 13, a lens 15 and a white LED 17, which is a backlight, therein. The liquid-crystal element 13 has a structure in which a polarized light plate is attached to each of a front surface and a back surface of a TFT liquid-crystal panel. Light emitted from the white LED 17 is applied to the liquid-crystal element 13 via the lens 15. Consequently, the liquid-crystal element 13 luminously displays an image. Display light 20 of the image luminously displayed on the liquid-crystal display 16 is reflected by the cold mirror 12 and the concave mirror 18 in order and projected onto a windshield or a combiner in front of a driver seat of the vehicle. Consequently, an image formed by the projected display light 20 is viewed by a driver or other occupants. The concave mirror 18 can be swung by a swing mechanism 28, and an angle of projection of the display light 20 can be adjusted by adjustment of an angle of the swing. The cold mirror 12 is held by the case 14 via a mirror holder 22 formed of, e.g., aluminum. A radiation fin 24 is attached to a back surface of the mirror holder 22. The radiation fin 24 is exposed outside the case 14. Sun light 26 reversely entering from the outside is reflected by the concave mirror 18 and then falls on the cold mirror 12. Then, infrared light contained in the sun light 26 penetrates the cold mirror 12 and is absorbed by the mirror holder 22. Consequently, the mirror holder 22 generates heat, and the heat is dissipated to the outside by the radiation fin 24.

Figure 1:
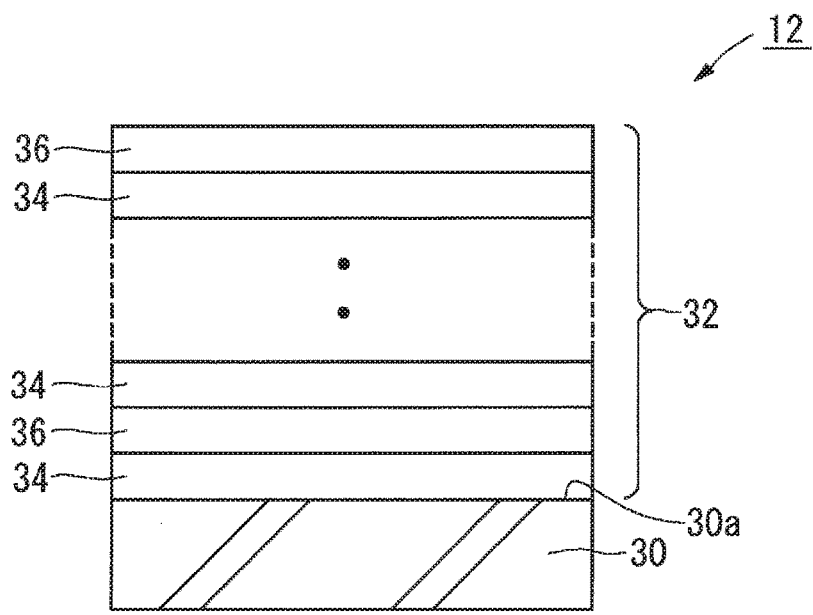
FIG. 1 is a diagram illustrating an embodiment of a cold mirror according to this invention incorporated in a HUD apparatus in FIG. 2, and schematically illustrates a stack structure of the cold mirror.

FIG. 1 illustrates an embodiment of the cold mirror 12. The cold mirror 12 is configured by forming a dielectric multi-layer 32 on a front surface (light incident surface) 30a of a substrate 30 of, e.g., glass. The dielectric multi-layer 32 is configured as a multi-layer film in which high refractive index films 34 formed of a high refractive index material and low refractive index films 36 formed of a low refractive index material are alternately stacked.

Table 1 indicates an example design of the cold mirror 12. Table 1 also indicates an example design of a conventional cold mirror used for comparison in characteristic with the cold mirror 12 of this example design. "Film thickness (nm)" means physical film thickness.

TABLE 1

|  |  | Film thickness(nm) | |
| --- | --- | --- | --- |
| Layer Substrate | Material Glass | Conventional product | Present invention product |
| 1 | TiO2 | 50.87 | 19.20 |
| 2 | SiO2 | 68.11 | 73.14 |
| 3 | TiO2 | 105.84 | 33.33 |
| 4 | SiO2 | 87.98 | 81.11 |
| 5 | TiO2 | 66.42 | 51.27 |
| 6 | SiO2 | 120.75 | 87.39 |
| 7 | TiO2 | 74.77 | 51.05 |
| 8 | SiO2 | 109.91 | 85.91 |
| 9 | TiO2 | 69.14 | 40.92 |
| 10 | SiO2 | 121.72 | 98.25 |
| 11 | TiO2 | 69.30 | 50.13 |
| 12 | SiO2 | 118.35 | 98.26 |
| 13 | TiO2 | 66.58 | 65.28 |
| 14 | SiO2 | 117.98 | 111.72 |
| 15 | TiO2 | 64.61 | 43.74 |
| 16 | SiO2 | 103.65 | 165.96 |
| 17 | TiO2 | 46.38 | 50.39 |
| 18 | SiO2 | 84.60 | 84.79 |
| 19 | TiO2 | 43.76 | 104.79 |
| 20 | SiO2 | 93.37 | 56.35 |
| 21 | TiO2 | 59.92 | 55.99 |
| 22 | SiO2 | 108.04 | 24.03 |
| 23 | TiO2 | 47.93 | 24.03 |
| 24 | SiO2 | 92.44 | 116.53 |
| 25 | TiO2 | 51.53 | 24.91 |
| 26 | SiO2 | 65.75 | 213.34 |
| 27 | TiO2 | 56.71 | 21.32 |
| 28 | SiO2 | 209.09 | 270.74 |
| Medium | Air | | |

The cold mirror 12 of this invention according to the design in Table 1 has the following configuration. The material of the substrate 30 is glass, the material of the high refractive index film 34 is TiO2, and the material of the low refractive index film 36 is SiO2. A high refractive index film 34 is formed as a first layer on a surface of the substrate 30, and low refractive index films 36 and high refractive index films 34 are alternately formed on that high refractive index film 34, and a low refractive index film 36 is then formed as a final 28-th layer, whereby a dielectric multi-layer 32 of a total of 28 layers is configured. A surface of the final 28-th layer is in contact with air. The design of the conventional cold mirror in Table 1 is different from the design of the cold mirror 12 of this invention in Table 1 only in film thicknesses of the high refractive index films and the low refractive index films and is the same as the design of the cold mirror 12 of this invention in the Table 1 in specifications other than the film thicknesses (e.g., materials of the substrate, the high refractive index films and the low refractive index films, the number of layers in the dielectric multi-layer and the order in which the high refractive index films and the low refractive index films are stacked).

Optical characteristics of the cold mirror 12 of this invention of the design in Table 1 and optical characteristics of the conventional cold mirror of the design in Table 1 will be described with reference to FIGS. 3 to 6. The characteristics are all simulated values. Also, the characteristics are all those when an incident angle is 30 degrees. First, FIG. 3 indicates spectral reflectivity characteristics. The reflectivity is an average reflectivity of p-polarized light and s-polarized light. According to FIG. 3, not only the conventional cold mirror but also the cold mirror of this invention has a cold mirror characteristic of transmitting infrared light and reflecting visible light. Therefore, even if sun light 26 reversely enters the HUD apparatus (FIG. 2), infrared light penetrates the cold mirror 12 and thus does not enter the liquid-crystal display 16. Consequently, deterioration of the liquid-crystal element 13 due to infrared light is prevented. The conventional cold mirror has a high average reflectivity for a visible light range (420 to 680 nm) compared to the cold mirror of this invention, but the cold mirror of this invention also has an average reflectivity of 91.8%. Therefore, the cold mirror of this invention has a visible light reflectivity that is sufficient for a cold mirror for a HUD apparatus. The reason of the high average reflectivity of the conventional cold mirror for a HUD apparatus for the visible light range is that the cold mirror is designed considering spectral reflectivity characteristic optimization only, without considering a reflection phase difference.

Figure 4:
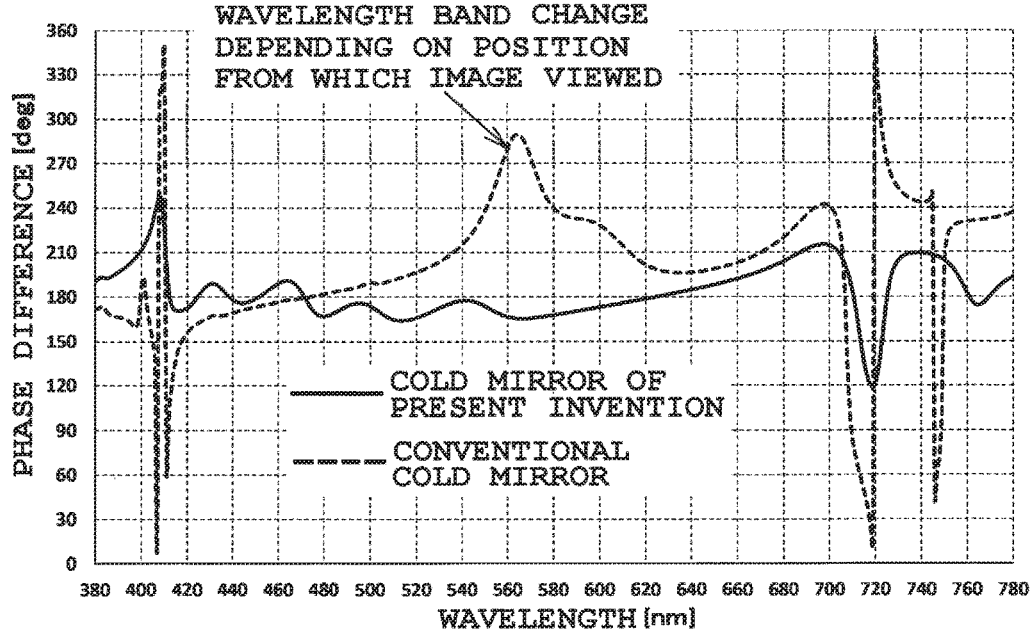
FIG. 4 is a graph indicating respective spectral reflection phase difference characteristics (simulated values) of the cold mirror in FIG. 1 and a conventional cold mirror (which is the same as the conventional cold mirror mentioned with reference to FIG. 3)

FIG. 4 indicates spectral reflection phase difference characteristics. As the reflection phase difference is more constantly around 180 degrees, large variation in intensity of light in the visible light range when a position from which an image is viewed is shifted is suppressed, enabling suppression of a phenomenon of change in color tone of the image. According to the characteristic of the conventional cold mirror in FIG. 4, the reflection phase difference exceeds 240 degrees (=180+60 degrees) in a band of around 550 to 580 nm. If there is a band in which the reflection phase difference largely exceeds 180 degrees (polarized light state largely varies) in the visible light range as described above, when a position from which an image is viewed is shifted, an intensity of light in that band largely varies, resulting in change in color tone of the image. On the other hand, according to the characteristic of the cold mirror of this invention in FIG. 4, the reflection phase difference falls within a range of 180±60 degrees in the entire visible wavelength range of 420 to 680 nm. Therefore, even if the position from which the image is viewed is shifted, variation in intensity of light in that band is suppressed. As a result, a phenomenon of change in color tone of the image can be suppressed. In other words, while the reflectivity characteristic is sacrificed a little in the cold mirror of this invention compared to the conventional cold mirror, the reflection phase difference characteristic is greatly improved in the cold mirror of this invention compared to the conventional cold mirror. In particular, according to the characteristic of the cold mirror of this invention in FIG. 4, the reflection phase difference falls within a range of 180±30 degrees for the entire visible wavelength range of 420 to 680 nm, particularly enabling suppression of change in color tone of an image. Here, although the reflectivity characteristic is sacrificed a little in the cold mirror of this invention compared to the conventional cold mirror, as described above, the cold mirror of this invention has an average reflectivity of 91.8%, which is still high.

Figure 5:
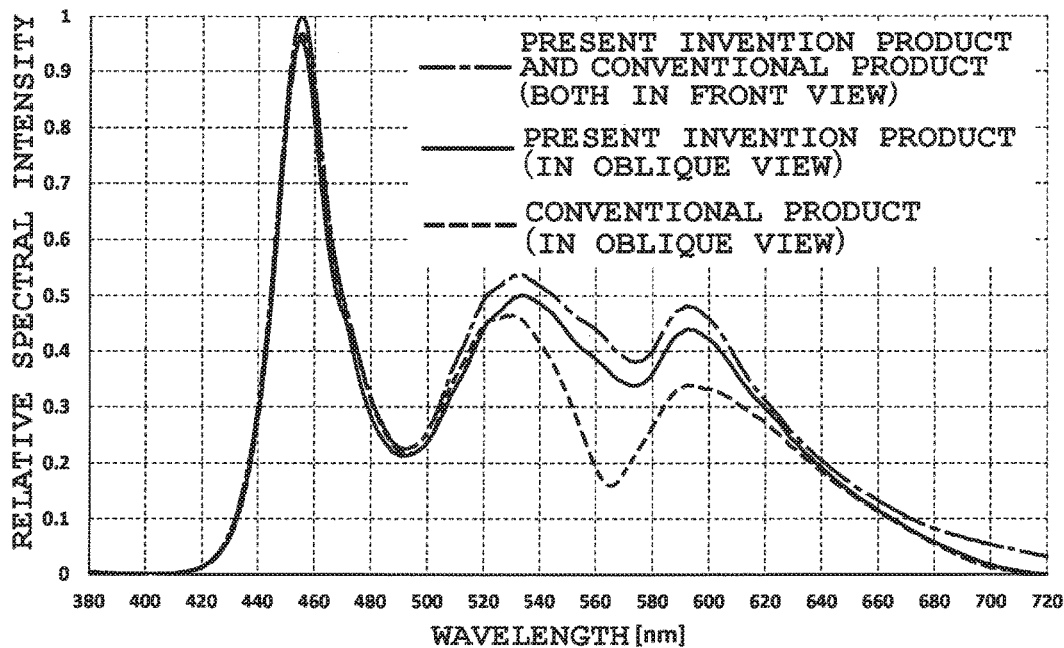
FIG. 5 is a graph indicating relative spectral intensity characteristics of reflected images from the cold mirror in FIG. 1 and a conventional cold mirror (which is the same as the conventional cold mirror mentioned with reference to FIG. 3) and indicates characteristics when a position from which the reflected images are viewed is shifted (the characteristics are all simulated values)
Figure 6:
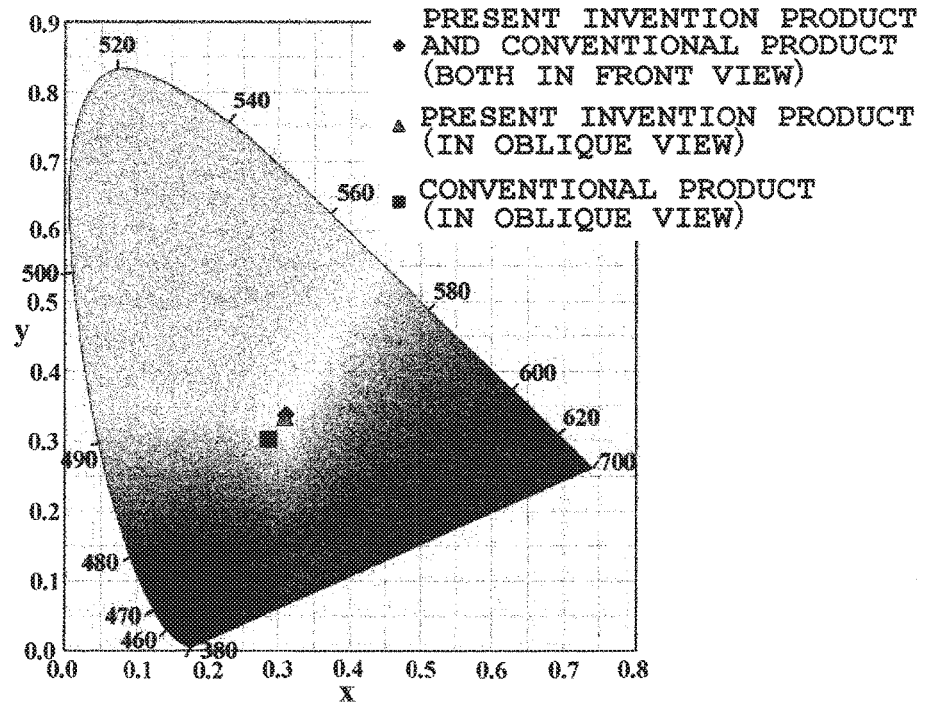
FIG. 6 is a chromaticity diagram indicating chromatic coordinates according to the respective characteristics in FIG. 5.

FIG. 5 indicates relative spectrum intensity characteristics of reflected images from both cold mirrors when a position from which the reflected images are viewed is shifted. A white image displayed on an entire liquid-crystal display using a white LED as a backlight is assumed as a light source of each of the reflected images. The alternate long and short dash line indicates a characteristic when each of the reflected images is viewed from a front position (hereinafter "front view"), which is a characteristic common to both cold mirrors. The solid line and the dash line each indicate a characteristic when each of the reflected images is viewed from a same position shifted from the front position (hereinafter "oblique view"): the solid line indicates a characteristic of the cold mirror of this invention; and the dashed line indicates a characteristic of the conventional cold mirror. According to FIG. 5, there is no large variation in relative spectrum intensity characteristic of the cold mirror of this invention between the front view (alternate long and short dash line) and the oblique view (solid line). On the other hand, there is large variation in relative spectrum intensity characteristic of the conventional cold mirror between the front view (alternate long and short dash line) and the oblique view (dashed line). In other words, the relative spectrum intensity of the conventional cold mirror significantly decreases in a range of around 530 to 620 nm in the oblique view relative to the front view. FIG. 6 indicates chromatic coordinates of the respective characteristics in FIG. 5 on a chromaticity diagram. According to FIG. 6, in the case of the cold mirror of this invention, chromatic coordinates in the oblique view roughly correspond to chromatic coordinates in the front view (chromatic coordinates of white). On the other hand, in the case of the conventional cold mirror, it can be seen that chromatic coordinates in the oblique view deviate from chromatic coordinates in the front view, compared to the chromatic coordinates in the oblique view in the case of the cold mirror of this invention.

The cold mirror according to this invention and the conventional cold mirror in Table 1 were fabricated, and a test of both cold mirrors was conducted. In this test, a white image was displayed on an entire display screen of a liquid-crystal display, the image was reflected by each cold mirror and a reflected image of the image was viewed, and a position from which the reflected image was shifted to check a degree of change in color tone of the reflected image. As a result, it was confirmed that the cold mirror according to the above-described embodiment can suppress change in color tone of the reflected image due to shifting of the position from which the reflected image is viewed, compared to the conventional cold mirror.

What is claimed is:

1. A cold mirror suitable for a head-up display apparatus, the cold mirror reflecting an image displayed on a display to make a reflected image of the image be viewed by a viewer, wherein
    when a difference between an amount of variation in phase of p-polarized light reflected by the cold mirror between before and after the reflection and an amount of variation in phase of s-polarized light reflected by the cold mirror between before and after the reflection is defined as a reflection phase difference, a relationship between an incident wavelength and the reflection phase difference is set so that the reflection phase difference falls within a range of 180±60 degrees for an entire visible wavelength range of 420 to 680 nm for display light of the image falling on the cold mirror at an incident angle of 30 degrees.

2. The cold mirror according to claim 1, wherein
    the reflection phase difference of the cold mirror is set within a range of 180±30 degrees for the entire visible wavelength range of 420 to 680 nm for the display light of the image falling on the cold mirror at the incident angle of 30 degrees.

3. The cold mirror according to claim 2, wherein an average reflectivity of the cold mirror for the visible wavelength range of 420 to 680 nm is set to no less than 90%.

4. A head-up display apparatus comprising a cold mirror according to claim 3.

5. A head-up display apparatus comprising a cold mirror according to claim 2.

6. The cold mirror according to claim 1, wherein an average reflectivity of the cold mirror for the visible wavelength range of 420 to 680 nm is set to no less than 90%.

7. A head-up display apparatus comprising a cold mirror according to claim 6.

8. A head-up display apparatus comprising a cold mirror according to claim 1.

9. The cold mirror according to claim 1, wherein the cold mirror comprising a substrate and a dielectric multi-layer formed on a front surface of the substrate.

10. The cold mirror according to claim 9, wherein the dielectric multi-layer comprising a structure in which $TiO_2$ films and $SiO_2$ films are alternately stacked.

11. A head-up display apparatus comprising a cold mirror according to claim 10.

12. A head-up display apparatus comprising a cold mirror according to claim 9.

* * * * *